United States Patent
Ouyang et al.

(10) Patent No.: US 11,370,909 B2
(45) Date of Patent: Jun. 28, 2022

(54) BIODEGRADABLE POLYESTER COMPOSITION AND USE THEREOF

(71) Applicant: KINGFA SCI. & TECH. CO., LTD., Guangdong (CN)

(72) Inventors: Chunping Ouyang, Guangdong (CN); Jian Jiao, Guangdong (CN); Kaijin Mai, Guangdong (CN); Xueteng Dong, Guangdong (CN); Hui Yang, Guangdong (CN); Weida Qu, Guangdong (CN); Kai Xiong, Guangdong (CN); Changli Lu, Guangdong (CN); Xiangbin Zeng, Guangdong (CN); Tongmin Cai, Guangdong (CN); Xianbo Huang, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 0 days.

(21) Appl. No.: 16/644,459

(22) PCT Filed: May 24, 2019

(86) PCT No.: PCT/CN2019/088370
§ 371 (c)(1),
(2) Date: Mar. 4, 2020

(87) PCT Pub. No.: WO2019/228273
PCT Pub. Date: Dec. 5, 2019

(65) Prior Publication Data
US 2021/0061989 A1 Mar. 4, 2021

(30) Foreign Application Priority Data
May 28, 2018 (CN) .......................... 201810522059.5

(51) Int. Cl.
| *C08L 67/02* | (2006.01) |
| *C08L 3/02* | (2006.01) |
| *C08J 5/18* | (2006.01) |
| *C08K 3/26* | (2006.01) |
| *C08K 3/34* | (2006.01) |
| *C08K 5/053* | (2006.01) |

(52) U.S. Cl.
CPC .................. *C08L 67/02* (2013.01); *C08J 5/18* (2013.01); *C08K 3/26* (2013.01); *C08K 3/34* (2013.01); *C08K 5/053* (2013.01); *C08L 3/02* (2013.01); *C08J 2367/02* (2013.01); *C08J 2403/02* (2013.01); *C08K 2003/265* (2013.01); *C08L 2201/06* (2013.01)

(58) Field of Classification Search
None
See application file for complete search history.

(56) References Cited

U.S. PATENT DOCUMENTS

| 6,787,613 | B2* | 9/2004 | Bastioli .................. C08J 5/18 525/411 |
| 2008/0161449 | A1* | 7/2008 | Yamamoto ............ C08L 97/005 524/35 |
| 2009/0312456 | A1* | 12/2009 | Changping ............. C08L 67/00 523/128 |
| 2012/0107527 | A1 | 5/2012 | Auffermann |

FOREIGN PATENT DOCUMENTS

| CN | 1215119 | C | | 8/2005 |
| CN | 101003646 | A | | 7/2007 |
| CN | 102492267 | A | | 6/2012 |
| CN | 103044866 | | * | 4/2013 |
| CN | 101522797 | B | | 6/2013 |
| CN | 102639594 | B | | 4/2014 |
| CN | 102597105 | B | | 2/2015 |
| CN | 104479317 | | * | 4/2015 |
| CN | 104974478 | | * | 10/2015 |
| CN | 108795001 | A | | 11/2018 |

OTHER PUBLICATIONS

Rychter, Study of Aliphatic-Aromatic Copolyester Degradation in Sandy Soil and Its Ecotoxicological Impact; Biomacromolecules 2010, 11, pp. 839-847. (Year: 2010).*

Uwe Witt, Motonori Yamamoto, Ursula Seeliger, Rolf-Joachim Müller, and Volker Warzelhan, Biodegradable Polymeric MaterialsÐNot the Origin but the Chemical Structure Determines Biodegradability, Angew. Chem. Int. Ed. 1999, 38, No. 10.

* cited by examiner

*Primary Examiner* — David J Buttner
(74) *Attorney, Agent, or Firm* — JCIPRNET

(57) ABSTRACT

The present invention discloses a biodegradable polyester composition, wherein the biodegradable polyester composition comprises the following components in parts by weight: i) 58 to 80 parts by weight of an aliphatic-aromatic copolyester; ii) 20 to 32 parts by weight of starch; and iii) 0 to 10 parts by weight of a processing agent. The present invention unexpectedly found by research that by using an aliphatic-aromatic copolyester in which an amount of aromatic carboxylic acid accounts for a total amount of diacid is 44 mol % to 48 mol % as a matrix resin, where the aliphatic-aromatic copolyester has a crystallization peak width D of 5° C. to 16° C., and by using starch of which a particle size D (50) is 2 μm to 12 μm as the other phase, and meanwhile by adding a specific amount of a processing agent, the polyester composition prepared has excellent transversal and longitudinal tear strengths, and the polyester composition has a biodegradation rate of 90% or more during the 12-week degradation test, satisfying the industrial compost.

10 Claims, No Drawings

BIODEGRADABLE POLYESTER COMPOSITION AND USE THEREOF

CROSS-REFERENCE TO RELATED CASES

This application is a U.S. national phase entry of PCT Application No. PCT/CN2019/088370 filed May 24, 2019, which claims priority to Chinese Patent Application No. CN201810522059.5 filed May 28, 2018, each of which is hereby incorporated by reference herein, in its entirety, for all purposes. The Application Data Sheet filed herewith forms a part of the present application, and all priority documents to which it refers are incorporated by reference herein in their entirety.

TECHNICAL FIELD

The present invention belongs to the technical field of polymer material modification, and specifically relates to a biodegradable polyester composition and use thereof.

BACKGROUND

Biodegradable polyester is a kind of polymer materials using biological resources as raw material. With respect to the petroleum-based polymer using petrochemical resources as raw material, the biodegradable polyester can be degraded during the biological or biochemical effect or in the biotic environment, being one of the degradable materials that are most active in the research of biodegradable plastics and have best market application.

Current polyester compositions that use aliphatic polyester or aliphatic-aromatic copolyester as a basic resin are widely used in fields of shopping bag, kitchen garbage bag, etc. The longitudinal and transversal tear performances are important indicators of a film to evaluate the performance of the prepared products such as shopping bag, kitchen garbage bag, etc. As mentioned in Chinese patent CN101522797B, a deficiency of the starch-based biodegradable bag currently existing in the market is lack of uniformity of mechanical performances, especially the transversal and longitudinal tear strengths. In the case that a film that is prepared from the starch-based biodegradable polyester composition has a thickness of 18 μm to 20 μm, the film is still too soft or too brittle to bear a certain limit weight. Limitation of these performances becomes particularly obvious in low-humidity condition due to lack of moisture in the composition.

In Chinese patent CN101522797B, by selecting starch with an average size of less than 0.3 μm as the dispersion phase, and a rigid and brittle polymer with a modulus of more than 1000 MPa as the other dispersion phase, and meanwhile by processing the composition with a extruder or other machine in such reduced temperature and shear condition, a starch dispersion phase with small particle size and a rigid and brittle polymer dispersion phase with typical layer structure are obtained. Although the above-mentioned method greatly improves the uniformity of material longitudinal and transversal tear performances, the following issues exist: if nano starch is used as the dispersion phase, on one hand the starch is prone to agglomeration due to its small particles, and in order to solve the problem of dimensional stability, specific processing equipment and processing technic are required, which does not possess universality; and on the other hand, nano starch is more expensive than the common size starch, resulting in low cost-performance of product.

In Chinese patent CN102639594B, an aliphatic-aromatic copolyester in which a content of aromatic acid accounts for 48 to 70 mol % of a total molar content of dicarboxylic acid is used as a basic resin, where starch with an average size of 1μm is used as a dispersion phase, so as to improve the mechanical performance of the polyester composition to a certain extent.

It is reported by Chinese patent CN102597105B that the polyester which is currently commercially available generally has less than 48 mol % of aromatic carboxylic acid. If the content of the aromatic carboxylic acid goes beyond such threshold value, biodegradation percentage of such polyester would significantly decreases, and it is difficult to achieve effective degradation in the condition of industrial compost or domestic compost.

It is reported by Muller etc. (*Angew. Chem., Int. Ed* (1999), 38, 1438-1441) that a copolymer of poly(butyleneadipate-co-terephthalate) type in which a mole fraction of terephthalic acid is 42% can be completely biodegraded within 12 weeks in the compost, while a product in which a mole fraction of terephthalic acid is 51% has a biodegradation percentage of less than 40%.

It is reported by Chinese patent CN02804139.9 that in order to comply with the biodegradation characteristics of CEN 13432 method, the content of terephthalic acid (based on the moles of total acid) in the biodegradable aliphatic-aromatic polymer shall not exceed 55%, preferably not exceed 50%.

Through research, the present invention surprisingly finds out that by using an aliphatic-aromatic copolyester in which an amount of aromatic carboxylic acid accounts for 44 mol % to 48 mol % of a total amount of diacid as a matrix resin, where the aliphatic-aromatic copolyester has a crystallization peak width D of 5° C. to 16° C., and by using starch of which a particle size D (50) is 2 μm to 12 μm as the other phase, and meanwhile by adding a specific amount of a processing agent, a polyester composition prepared has excellent transversal and longitudinal tear strengths, and the polyester composition has a biodegradation rate of 90% or more during the 12-week degradation test, satisfying the industrial compost.

SUMMARY OF THE INVENTION

In order to overcome the deficiencies or drawbacks of the prior art, the first objective of the present invention is to provide a biodegradable polyester composition. The polyester composition has excellent transversal and longitudinal tear strengths, and the polyester composition has a biodegradation rate of 90% or more during the 12-week degradation test, satisfying the industrial compost.

The present invention is achieved by the following technical solution.

A biodegradable polyester composition includes the following components in parts by weight:
i) 58 to 80 parts by weight of an aliphatic-aromatic copolyester;
ii) 20 to 32 parts by weight of starch; and
iii) 0 to 10 parts by weight of a processing agent.

Preferably, the biodegradable polyester composition includes the following components in parts by weight:
i) 62 to 80 parts by weight of the aliphatic-aromatic copolyester;
ii) 20 to 30 parts by weight of starch; and
iii) 0 to 8 parts by weight of the processing agent.

Particularly, as for the component i), in the aliphatic-aromatic copolyester, an amount of aromatic carboxylic acid accounts for 44 mol % to 48 mol % of a total amount of diacid, and a crystallization peak width D of the aliphatic-aromatic copolyester is 5° C. to 16° C., preferably 8° C. to 12° C.

In the present invention, by selecting an aliphatic-aromatic copolyester in which the amount of aromatic carboxylic acid accounts for 44 mol % to 48 mol % of the total amount of diacid as a matrix resin, neither the mechanical performance of the polyester composition would be deteriorated due to the too low content of terephthalic acid, nor the biodegradation performance of the polyester composition would be greatly affected due to the too high content of terephthalic acid. In addition, by selecting the aliphatic-aromatic copolyester of which the crystallization peak width D is 5° C. to 16° C., the prepared polyester composition has relatively good crystallization performance. Meanwhile, according to different requirement of different application fields to the material mechanical performance, additive amount of the aliphatic-aromatic copolyester is screened.

In the component i) of the present invention, the aliphatic-aromatic copolyester is selected from one or a mixture of poly(butyleneadipate-co-terephthalate) (PBAT) and poly(butylene sebacate-co-terephthalate) (PBSeT).

In the present invention, starch is used as the component ii) of the polyester composition. In view of that starch is a polymer from the natural source and has characteristics of low cost and low toxicity, by blending starch with the aliphatic-aromatic copolyester, not only the mechanical performance of the polyester composition can be improved, but also cost for the composition can be significantly reduced. Meanwhile, as a polymer from the natural source, starch is conducive to improving the biodegradation performance of the polyester composition.

In the component ii) of the present invention, the starch has a particle size D (50) of 2 μm to 12 μm, preferably 3 μm to 11 μm, and more preferably 5 μm to 10 μm. The larger the particle size of the starch, the less likely to agglomerate, being conducive to disperse the polyester composition. However, when the particle size D (50) of the starch exceeds 12 μm, surface characteristic (rough) of a film product would be affected by the starch in too large particles, causing that a higher processing temperature is required during the processing of the polyester composition to realize the material plasticization. The too high processing temperature would result in degradation of the aliphatic-aromatic copolyester, thereby affecting the material performance. Meanwhile, the too high processing temperature would also result in exorbitant energy consumption and processing cost.

The processing agent is selected from one or a mixture of more of water, glycerin, polyglycerin, epoxy soybean oil, citrate, acetyl citrate, ethylene glycol and polyethylene glycol, preferably one or a mixture of more of water, glycerin and polyglycerin.

The biodegradable polyester composition, in parts by weight, further includes 0 to 20 parts by weight of an organic or inorganic filler.

The organic filler is selected from one or a mixture of more of natural fiber, straw and wood powder; and the inorganic filler is selected from one or a mixture of more of talcum powder, montmorillonite, kaolin, chalk, calcium carbonate, graphite, gypsum, conductive carbon black, calcium chloride, iron oxide, dolomite, silicon dioxide, wollastonite, titanium dioxide, silicate, mica, glass fiber and mineral fiber.

According to actual performance requirement, the biodegradable polyester composition of the present invention, in parts by weight, further includes 0 to 4 parts by weight of other additive: a release agent, a surfactant, wax, an antistatic agent, a dye, an anti-UV additive or other plastic additives.

The release agent is: silicone master batch, montan wax, erucylamide or oleamide.

The surfactant is one or a mixture of more of polysorbate, palmitate, and laurate.

The wax is one or a mixture of more of stearamide, behenamide, beeswax, and beeswax ester.

The antistatic agent is a permanent antistatic agent, and specific examples include one or a mixture of more of PELESTAT-230, PELESTAT-6500, and SUNNICO ASA-2500.

The dye is one or a mixture of more of carbon black, black color base, titanium white, zinc sulfide, phthalocyanine blue, and fluorescent orange.

The anti-UV additive includes a UV absorbent and a UV stabilizer.

The UV absorbent is one or more of UV-944, UV-234, UV531 and UV326.

The UV stabilizer is one or more of UV-123, UV-3896 and UV-328.

Said other plastic additives can be nucleating agent, antifogging agent, lubricant (e.g. calcium stearate), primary antioxidant, auxiliary antioxidant, plasticizer, etc.

A 12 μm±1 μm film prepared by the polyester composition of the present invention has excellent transversal and longitudinal tear strengths which are tested according to the standard ASTM D-882/88, The longitudinal tear strength is 1000 mN or more, preferably 1100 mN or more, and more preferably 1200 mN or more. The transversal tear strength is 2400 mN or more, preferably 2600 mN or more, and more preferably 2800 mN or more. The 12 μm±1 μm film prepared by the polyester composition of the present invention has a post-12-week biodegradation rate of more than 90% which is tested according to the standard ISO 16929 (2013).

The polyester composition of the present invention is biodegradable in the industrial compost according to the standard EN 13432.

The present invention also discloses use of the biodegradable polyester composition in preparing shopping bag, compost bag, mulching film, protective cover film, silo film, film tape, fabric, non-woven fabric, textile, fishing net, load-bearing bag or garbage bag.

Compared with the prior art, the present invention has the following beneficial effects:

the present invention unexpectedly found by research that by using an aliphatic-aromatic copolyester in which an amount of aromatic carboxylic acid accounts for 44 mol % to 48 mol % of a total amount of diacid as a matrix resin, where the aliphatic-aromatic copolyester has a crystallization peak width D of 5° C. to 16° C., and by using starch of which a particle size D (50) is 2 μm to 12 μm as the other phase, and meanwhile by adding a specific amount of a processing agent, the polyester composition prepared has excellent transversal and longitudinal tear strengths, and the polyester composition has a biodegradation rate of 90% or more during the 12-week degradation test, satisfying the industrial compost.

DETAILED DESCRIPTION OF THE PREFERRED EMBODIMENT

The present invention is further described by the following specific implementations. The following embodiments are the preferable implementations of the present invention, but the implementation of the present invention is not limited thereto.

Raw materials used by Embodiments and Comparative Examples of the present invention are as follows.

The component i) was selected from:

PBAT-1: an amount of aromatic carboxylic acid accounting for 46 mol % of a total amount of diacid, a crystallization peak width D of 11° C.;

PBAT-2: an amount of aromatic carboxylic acid accounting for 44 mol % of a total amount of diacid, a crystallization peak width D of 8° C.;

PBAT-3: an amount of aromatic carboxylic acid accounting for 48 mol % of a total amount of diacid, a crystallization peak width D of 15° C.;

PBAT-4: an amount of aromatic carboxylic acid accounting for 38 mol % of a total amount of diacid, a crystallization peak width D of 11° C.;

PBAT-5: an amount of aromatic carboxylic acid accounting for 58 mol % of a total amount of diacid, a crystallization peak width D of 11° C.;

PBAT-6: an amount of aromatic carboxylic acid accounting for 46 mol % of a total amount of diacid, a crystallization peak width D of 4° C.;

PBAT-7: an amount of aromatic carboxylic acid accounting for 46 mol % of a total amount of diacid, a crystallization peak width D of 25° C.;

PBAT-8: an amount of aromatic carboxylic acid accounting for 58 mol % of a total amount of diacid, a crystallization peak width D of 25° C.; and PBSeT: an amount of aromatic carboxylic acid accounting for 46 mol % of a total amount of diacid, a crystallization peak width D of 11° C.

The component ii) was selected from:

Starch-1, particle size D (50) of 4 μm;
Starch-2, particle size D (50) of 8 μm;
Starch-3, particle size D (50) of 12 μm;
Starch-4, particle size D (50) of 16 μm; and
Starch-5, particle size D (50) of 1 μm.

The component iii) was selected from the following processing agent: water, glycerin.

The fillers were selected from: talcum powder, calcium carbonate.

Other additives:

citrate was selected as a plasticizer; palmitate was selected as a surfactant; and other components were all commercially available.

Evaluation Methods for Each Performance Index:

Test method for crystallization peak width D of the aliphatic-aromatic copolyester:

by testing via the differential scanning calorimeter (DSC), specific test method is as follows: high-purity reference substance (indium) was used to calibrate the differential scanning calorimeter, 5 to 10 mg of aliphatic-aromatic copolyester was put into an aluminum-made crucible, heated to 220° C. at a rate of 10° C./min (the first scanning), kept at constant temperature for 5 minutes, and cooled to −30° C. at a rate of 10° C./min. A crystallization peak of the aliphatic-aromatic copolyester was obtained from a cooling curve in the differential analysis graph of the first scanning. The start terminal and the end terminal of the crystallization peak were taken to make tangent lines, and a temperature difference of the end points of the two tangent lines is the crystallization peak width.

Test method for particle size D (50) of starch:

the test method for particle size D (50) of starch in the present invention was performed referring to the method of GB/T 19077.1 *Particle Size Analysis—Laser Diffraction Method*.

Longitudinal and transversal tear strengths of the polyester composition were obtained by that: the polyester composition was made into a 12 μm±1 μm film which was subjected to the test according to standard ASTM D-882/88.

Post-12-week biodegradation rate of the polyester composition was obtained by that: the polyester composition was made into a 12 μm±1 μm film which was subjected to the test according to standard ISO 16929 (2013).

Embodiments 1-11 and Comparative Examples 1-4

According to the proportion of parts by weight in Table 1, the aliphatic-aromatic copolyester, starch, processing agents, fillers and other additives were mixed evenly and added to a single-screw extruder, extruded at 140° C.-240° C. and pelletized to obtain a biodegradable polyester composition. Test data for each performance of the obtained polyester composition is shown as Table 1.

TABLE 1

Proportion of each component and performance test results of the embodiments and comparative examples (part by weight)

| Component | | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 | Comparative Example 1 | Comparative Example 2 | Comparative Example 3 | Comparative Example 4 |
|---|---|---|---|---|---|---|---|---|---|---|---|---|---|---|---|---|
| Aliphatic-aromatic copolyester | PBAT-1 | 70 | | | | | | | | | | | 50 | 90 | 70 | 70 |
| | PBAT-2 | | 70 | | | | | | | | | | | | | |
| | PBAT-3 | | | 70 | | | | | | | | | | | | |
| | PBAT-4 | | | | | 70 | | | | | | | | | | |
| | PBAT-5 | | | | 70 | | | | | | | | | | | |
| | PBAT-6 | | | | | | 70 | | | | | | | | | |
| | PBAT-7 | | | | | | | 70 | | | | | | | | |
| | PBAT-8 | | | | | | | | 70 | | | | | | | |
| | PBSeT | | | | | | | | | 70 | 70 | 70 | | | | |
| Starch | Starch-1 | 25 | | | | | | | | | | | 25 | 25 | 10 | 40 |
| | Starch-2 | | 25 | | | | | | | | | | | | | |
| | Starch-3 | | | 25 | 25 | 25 | 25 | 25 | 25 | 25 | | | | | | |
| | Starch-4 | | | | | | | | | | 25 | | | | | |
| | Starch-5 | | | | | | | | | | | 25 | | | | |
| Processing agent | Water | 3 | 3 | 3 | 3 | 3 | 3 | 3 | 3 | 3 | 3 | 3 | 3 | 3 | 3 | 3 |
| | Glycerin | 3 | 3 | 3 | 3 | 3 | 3 | 3 | 3 | 3 | 3 | 3 | 3 | 3 | 3 | 3 |
| Filler | Talcum powder | 2 | 2 | 2 | 2 | 2 | | 2 | | | 2 | 2 | 2 | | 2 | |
| | Calcium carbonate | | | | | | 2 | | 2 | 2 | | | | 2 | | 2 |
| Other Additive | Plasticizer | | 2 | | 2 | | | | | | | | | | | |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Longitudinal tear strength | | 1098 | 1273 | 1156 | 1063 | 989 | 963 | 952 | 921 | 889 | 867 | 844 | 782 | 801 | 712 | 698 |
| Transversal tear strength | | 2793 | 3123 | 2901 | 2682 | 2374 | 2263 | 2193 | 2223 | 2102 | 2011 | 2000 | 1912 | 1908 | 1954 | 1783 |
| Post-12-week biodegradation rate (%) | | 96.7 | 98.3 | 97.1 | 96.2 | 95.3 | 94.2 | 93.6 | 93.1 | 92.4 | 91.2 | 91.1 | 90.7 | 90.4 | 90.1 | 90.3 |

What is claimed is:

1. A biodegradable polyester composition, comprising:
   i) 58 to 80 parts by weight of an aliphatic-aromatic copolyester;
   ii) 20 to 32 parts by weight of starch; and
   iii) 0 to 10 parts by weight of a processing agent
   wherein in the component ii), the starch has a particle size D (50) of 2 μm to 12 μm,
   wherein as for the component i), in the aliphatic-aromatic copolyester, an amount of aromatic carboxylic acid accounts for 44 mol % to 48 mol % of a total amount of diacid, and a crystallization peak width D of the aliphatic-aromatic copolyester is 5° C. to 16° C., wherein in the component i), the aliphatic-aromatic copolyester is selected from one or a mixture of poly (butyleneadipate-co-terephthalate) (PBAT) and poly (butylene sebacate-co-terephthalate) (PBSeT).

2. The biodegradable polyester composition according to claim 1, wherein the biodegradable polyester composition comprises the following components in parts by weight:
   i) 62 to 80 parts by weight of the aliphatic-aromatic copolyester;
   ii) 20 to 30 parts by weight of starch; and
   iii) 0 to 8 parts by weight of the processing agent.

3. The biodegradable polyester composition according to claim 1, wherein a 12μm ±1μm film prepared by the polyester composition has a longitudinal tear strength, which is tested according to the standard ASTM D-882/88, of 1000 mN or more; the 12μm±1μm film prepared by the polyester composition has a transversal tear strength, which is tested according to the standard ASTM D-882/88, of 2400 mN or more; the 12μm ±1μm film prepared by the polyester composition has an post-12-week biodegradation rate of more than 90% which is tested according to the standard ISO 16929 (2013).

4. The biodegradable polyester composition according to claim 1, wherein the processing agent is selected from one or more of water, glycerin, polyglycerin, epoxy soybean oil, citrate, acetyl citrate, ethylene glycol, and polyethylene glycol.

5. The biodegradable polyester composition according to claim 1, wherein the biodegradable polyester composition further comprises 0 to 20 parts by weight of an organic filler or an inorganic filler.

6. The biodegradable polyester composition according to claim 5, wherein the organic filler is selected from one or more of natural fiber, straw and wood powder; and the inorganic filler is selected from one or a mixture of more or talcum powder, montmorillonite, kaolin, chalk, calcium carbonate, graphite, gypsum, conductive carbon black, calcium chloride, iron oxide, dolomite, silicon dioxide, wollastonite, titanium dioxide, silicate, mica, glass fiber and mineral fiber.

7. The biodegradable polyester composition according to claim 2, wherein a 12μm±1μm film prepared by the polyester composition has a longitudinal tear strength, which is tested according to the standard ASTM D-882/88, of 1000 mN or more; the 12μm±1μm film prepared by the polyester composition has a transversal tear strength, which is tested according to the standard ASTM D-882/88, of 2400 mN or more; the 12μm±1μm film prepared by the polyester composition has an post-12-week biodegradation rate of more than 90% which is tested according to the standard ISO 16929 (2013).

8. The biodegradable polyester composition according to claim 2, wherein the processing agent is selected from one or more of water, glycerin, polyglycerin, epoxy soybean oil, citrate, acetyl citrate, ethylene glycol, and polyethylene glycol.

9. The biodegradable polyester composition according to claim 2, wherein the biodegradable polyester composition further comprises 0 to 20 parts by weight of an organic filler or an inorganic filler.

10. The biodegradable polyester composition according to claim 9, wherein the organic filler is selected from one or a mixture of more of natural fiber, straw and wood powder; and the inorganic filler is selected from one or more or talcum powder, montmorillonite, kaolin, chalk, calcium carbonate, graphite, gypsum, conductive carbon black, calcium chloride, iron oxide, dolomite, silicon dioxide, wollastonite, titanium dioxide, silicate, mica, glass fiber and mineral fiber.

* * * * *